(12) United States Patent
Slotholt et al.

(10) Patent No.: US 9,198,441 B1
(45) Date of Patent: Dec. 1, 2015

(54) REMOVING THE SPINAL COLUMN FROM A HALF-CARCASS OF A SLAUGHTERED ANIMAL

(71) Applicants: IH Food A/S, Copenhagen V (DK); SFK Leblanc A/S, Kolding (DK)

(72) Inventors: Henrik Slotholt, Copenhagen S (DK); Jonas Sølvhøj, Nykøbing F. (DK)

(73) Assignees: IH Food A/S, Copenhagen V (DK); SFK Leblanc A/S, Kolding (DK)

( * ) Notice: Subject to any disclaimer, the term of this patent is extended or adjusted under 35 U.S.C. 154(b) by 0 days.

(21) Appl. No.: 14/737,312

(22) Filed: Jun. 11, 2015

(30) Foreign Application Priority Data

Jun. 10, 2015 (DK) .................................. 2015 70356

(51) Int. Cl.
*A22C 17/00* (2006.01)
*A22B 5/00* (2006.01)

(52) U.S. Cl.
CPC ............. *A22B 5/0035* (2013.01); *A22C 17/004* (2013.01)

(58) Field of Classification Search
CPC .. A22C 17/00; A22C 17/0006; A22C 17/002; A22C 17/004; A22C 17/0046; A22C 17/04

USPC .......... 452/134, 136, 149–153, 171, 155–157
See application file for complete search history.

(56) References Cited

U.S. PATENT DOCUMENTS

| | | | | |
|---|---|---|---|---|
| 5,295,896 | A * | 3/1994 | Petersen | A22B 5/0029 452/135 |
| 7,476,166 | B2 * | 1/2009 | Yearick | A63B 59/02 473/505 |
| 7,635,294 | B2 * | 12/2009 | Tomcak | A22B 5/0035 452/135 |
| 7,892,076 | B2 * | 2/2011 | Mirtsching | A22C 9/002 452/141 |
| 8,485,871 | B2 * | 7/2013 | Bolte | A22C 17/004 452/140 |
| 8,915,773 | B2 * | 12/2014 | Nielsen | A22B 5/0041 452/150 |

* cited by examiner

*Primary Examiner* — Richard Price, Jr.
(74) *Attorney, Agent, or Firm* — Knobbe Martens Olson & Bear LLP

(57) ABSTRACT

The present invention relates to the slaughtering industry where slaughtered animals are cut along the median plane to provide a pair of half-carcasses, and the spinal column, also referred to as the vertebral column, is removed from the half-carcasses.

16 Claims, 4 Drawing Sheets

REMOVING THE SPINAL COLUMN FROM A HALF-CARCASS OF A SLAUGHTERED ANIMAL

CROSS-REFERENCES TO RELATED APPLICATIONS

This application claims the benefit of priority to Danish Patent Application No. PA 2015 70356, filed on Jun. 10, 2015, the disclosure of which is hereby expressly incorporated by reference in its entirety.

BACKGROUND OF THE INVENTION

1. Field of the Invention

The present invention relates to the slaughtering industry where slaughtered animals are cut along the median plane to provide a pair of half-carcasses, and the spinal column, also referred to as the vertebral column, is removed from the half-carcasses.

2. Background of the Invention

U.S. Pat. No. 8,915,773 discloses a method for separation of the spinal column from a carcass middle part. The method disclosed therein comprises the steps of determining a cutting path for a cutting device for the separation of the spinal column from the carcass middle part; separating the spinal column from the carcass middle part by causing a relative movement between the middle part and the cutting device and simultaneously causing the cutting device to engage the carcass middle. The method includes: optically scanning the middle part to provide a scan of an outer surface of the carcass middle part and identifying and locating the spinal canal in the spinal column on the basis of digital processing. The cutting path is subsequently to the scanning determined on the basis of the position of the spinal canal and the cutting is carried subsequent to the scanning and determination of the cutting path.

The method disclosed in U.S. Pat. No. 8,915,773 requires that the spinal cord is optically detectable and the accuracy of the method therefore depends on the accuracy with which the carcass has been split along the median plane and reveals the spinal canal. Thus, if the carcass is not split perfectly along the median plane, e.g. if the cut is laterally offset, the spinal canal may not be detectable in an optical scan of the half-carcass. When this occurs, the method disclosed in U.S. Pat. No. 8,915,773 fails to provide cutting path and removal of the spinal column is to be removed by other means such as manually resulting in increased labour cost. In addition, the split may typically be offset typically up till 10 mm from a perfect split and/or it may further be angled relatively the median plane. Thus, even if the spinal column is detectable, the use of the position of the spinal column may lead to a relative high offset of the cutting plane may be offset too much or too little resulting in that either too much meat or too little bone is removed.

Hence, an improved method for removing the spinal column would be advantageous, and in particular a more efficient and/or reliable method for removing the spinal column would be advantageous.

OBJECT OF THE INVENTION

It is an object of the invention to provide a cutting method substantially independent of the cutting path used to split a carcass into two half-carcasses.

It is a further object of the present invention to provide an alternative to the prior art.

In particular, it may be seen as an object of the present invention to provide a method and device that solves the above mentioned problems of the prior art.

SUMMARY OF THE INVENTION

The invention provides a method of removing, at least partly, the spinal column from a half-carcass of a slaughtered animal that has been cut substantially along the median plane of the slaughtered animal thereby providing a median cut surface of the half-carcass. A method according to the present invention preferably comprises: locating, on the ventral side of the half-carcass, an anatomical structure defined in relation to joints between rib heads and the spinal column of the half-carcass, determining a characteristic geometrical feature of the median cut surface and/or of the ventral side of the half-carcass, where the characteristic geometrical feature typically comprises: a position on and/or a spatial orientation of at least a part of the exposed rib or spinal column, cutting along a cutting path, the cutting path being defined in relation to said anatomical structure and said characteristic geometrical feature of the median cut surface and/or of the ventral side of the half-carcass, so as to remove, at least partly, the spinal column from the half-carcass.

Thus, the present invention resides inter alia in the concept of locating an anatomical structure and determining a characteristic feature, and the anatomical structure and characteristic feature may be seen fixtures or waypoints relatively to which the cutting path is defined. While the anatomical structure is located in the sense that it represents an image of a well-defined anatomical element of the bones in half-carcass, the characteristic feature is determined as it relates to geometry of a point or part of the bones in the half-carcass.

The method of the invention thus bases the location of the cutting path on an anatomical structure on the ventral side of the half-carcass, e.g. the concavity defined in relation to joints between rib heads and a characteristic geometrical feature.

Preferably, the cutting path may pass through a position being offset a predetermined first offset to the located anatomical feature and a position in the half-carcass being offset a predetermined second offset from the characteristic geometrical feature. Typically, the offset may be determined by an operator by adjusting the offset(s) until a desired cut is produced; once the offsets are determined, they are typically used for subsequent cuts as predetermined offsets. The offsets may take typical values ranging from 0 mm to e.g. 30 mm, although the invention is not considered limited to offsets being within this range. Further, some embodiments of the uses an angle as offset.

Accordingly, in preferred embodiments the characteristic geometrical feature may be a spatial orientation, such as the spatial orientation of the median cut surface and wherein the second offset may be a predetermined angle with the characteristic geometrical feature. Also in this case, predetermined may refer to a situation, where the operator adjust the angle until a desired cut is produced and used for subsequent cuts as a predetermined angle.

The characteristic geometrical feature may preferably be a position and the second offset may be a predetermined orientated distance from the characteristic geometrical feature. By orientated distance it typically meant to denote a vector having a direction relative to a fix orientation (e.g. horizontal) and having a length.

As disclosed herein, the first and/or the second offset may be equal to zero.

According to preferred embodiments, the anatomical structure may be a concavity defined in relation to the joint between rib heads and thoracic vertebrae, top of rib heads, or a concavity below the rib head. Further, the characteristic geometrical feature may be a spinous process, the spatial orientation of the median cut surface, the spinal canal, the upper most position of the spinal column, or the tangent to the surface between the upper most position of the spinal column and the anatomical structure.

In embodiments in which the anatomical structure located is a concavity defined in relation to joints between rib heads and the spinal column of the half-carcass, the characteristic geometrical feature determined may be the spatial orientation of the median cut surface, and the cutting path may be provided so that it intersects the concavity or intersects a predetermined first offset therefrom and forming a predetermined angle with the median cut surface so as to remove, at least partly, the spinal column from the half-carcass.

Locating the anatomical feature can be performed optically and/or mechanically so as to provide data on a zone of the half-carcass, preferably including at least the concavity. Optical locators that can be used with the methods described herein include, for example, cameras and/or equipment, which generate, are configured to, or are capable of taking video images, stereo vision, scanning, time-of-flight measurements, X-rays, and/or structured light, as well as, mechanical locators, which are configured to or designed to locate the anatomical feature. Suitable combinations of such optical and mechanical locators can also be used with the methods described herein. Preferably, the characteristic geometrical feature and the anatomical feature are determined using devices adapted to carry out the optical and/or mechanical determinations.

The method of the invention can be performed on half-carcasses when arranged suspended in an orientation or when supported by a conveyor.

In an embodiment of the invention the method comprises moving the half-carcass, while supported by a conveyer, along a longitudinal direction of the spinal column, illuminating the ventral side of the moving half-carcass, and obtaining image data on the zone of the half-carcass, preferably including at least the concavity.

More specifically, in an embodiment of the invention illuminating the ventral side of the half-carcass includes projecting a beam of light defining a plane of light transverse to the direction of movement, and receiving projected light reflected from the half-carcass with a camera situated outside the plane of light to obtain profile information on the zone of the half-carcass, preferably including at least the concavity.

Preferably, the half-carcass may be arranged on a conveyor and means may be provided for stabilising the position of the half-carcass on the conveyor.

The half-carcass may preferably be arranged suspended in an orientation, and a method according to preferred embodiment of the invention may further comprise: illuminating the ventral side of the half-carcass by projecting a beam of light defining a plane of light transverse to the longitudinal direction of the spinal column, and receiving projected light reflected from the half-carcass with a camera situated outside the plane of light to obtain profile information on the zone of the half-carcass including at least the concavity.

In embodiments wherein the half-carcass is arranged on a conveyer, the conveyer may preferably comprise an encoder providing data on movements of the conveyer and thereby the half-carcass.

The spatial orientation of the median cut surface can be determined optically including e.g. taking video images, stereo vision, scanning, time-of-flight measurements, X-rays, structured light, mechanically configured to determine spatial orientation of the median curt, and suitable combinations of such methods.

Advantageously, the method of the invention is carried out so that preferably immediately after a first portion of the concavity has been located and the spatial orientation of a portion of the median cut surface at the portion of the concavity has been determined, the located first portion will be cut concurrently with a second portion of the concavity will be located. This sequence is repeated until the spinal column is at least partly removed and ensures a fast and efficient removal of the spinal column.

As there is no need for identifying by the method according to the invention whether the half-carcass is a right side or left side, the present invention is capable of handling both left and right sides of half-carcasses. Cutting to remove the spinal column can be performed using e.g. a circular cutting blade, a reciprocating cutting blade, an endless cutting blade or water-jet cutting.

In the present context a number of terms are used in manner being ordinary to a skilled person. Some of these terms are detailed below.

A carcass having been cut substantially along the median plane is used to mean that the carcass has been cut along the median plane so that each of the thereby to half-carcass comprises a section of the spinal column.

Half-carcass is used to mean an piece of meat including a part of the spinal column.

Longitudinal orientation or direction of the spinal column is used to mean the orientation from head to tail of the animal or vice versa.

BRIEF DESCRIPTION OF THE FIGURES

The present invention and in particular a preferred embodiment thereof will now be described in more detail with regard to the accompanying figures. The figures show ways of implementing the present invention and are not to be construed as being limiting to other possible embodiments falling within the scope of the attached claim set.

in FIG. 3 the following legends are used to indicates preferred steps according to the invention:
  I: locating an anatomical structure ($X_A, Y_A$),
  II: determining a characteristic geometrical feature as a spatial orientation
  III: using a predetermined offset (angle)
  IV: providing a cutting path passing through the located anatomical feature and a position being offset a predetermined amount from the characteristic geometrical feature
  X-Y coordinate system indicates that positions etc are preferably given with reference to a fixed coordinate system.

in FIG. 4 the following legends are used to indicates preferred steps according to the invention:
  I: locating an anatomical structure (XA,YA),
  II: determining a characteristic geometrical feature as a position
  III: using a predetermined 1st offset to offset the located anatomical feature, and using a predetermined 2nd offset, to IV: provide a cutting path passing through the offset located anatomical feature and a position being offset a predetermined amount from the characteristic geometrical feature, X-Y coordinate system indicates that positions etc are preferably given with reference to a fixed coordinate system.

DETAILED DESCRIPTION OF AN EMBODIMENT

Figure 1:
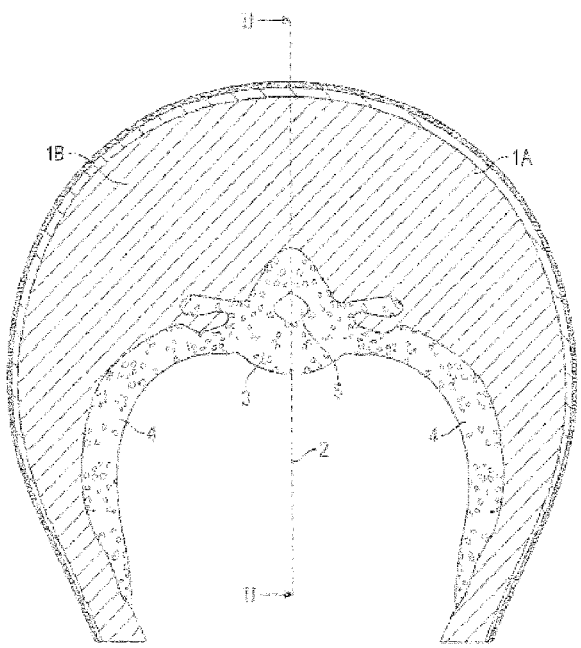
FIG. 1 is a schematically cross sectional view of a carcass.

FIG. 1 shows a cross section of the carcass of a slaughtered animal. A dotted line II-II indicates the medial plane 2 along which the carcass is to be cut to provide two half-carcasses 1A and 1B. The spinal column 3 with the spinal canal 5 and ribs 4 connected to the spinal column are seen.

Figure 2:
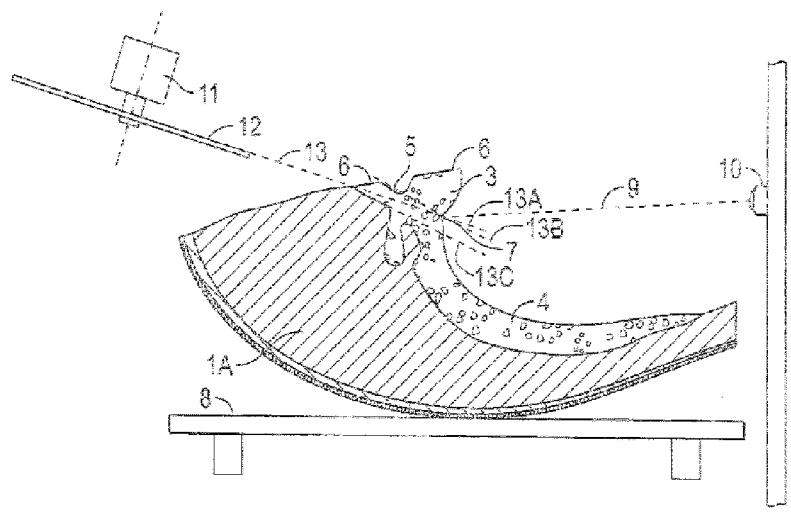
FIG. 2 is a schematically illustration of a half-carcass located on a conveyer prior to removal of spinal column.

FIG. 2 shows the half-carcass 1A supported by a conveyer 8. A scanner 10 projects light towards a zone of the ventral side of the half-carcass 1A, the zone including at least the concavity 7 defined in relation to joints between rib heads and the spinal column 3 of the half-carcass 1A. Light is reflected from the carcass and is received by a light receiver such as a camera in the scanner 10, and image data from the camera is processed to identify and locate the concavity 7.

It is noted that the half-carcass 1A, 1B may be provided in such a manner that it only has ribs along a part of the longitudinal direction thereof. In such cases, the method according to the invention is applied for the section comprising ribs and in the region not comprising ribs, e.g. the concavity between spinal column and a transverse process may be used for determining a cutting path.

Reference is made to FIGS. 3, 4 and 5A and 5B. As shown in these figures, the method of removing, at least partly, the spinal column from a half-carcass 1A, 1B of a slaughtered animal that has been cut substantially along the median plane 2 of the slaughtered animal thereby providing a median cut surface 6 of the half-carcass (1A, 1B), may comprise the steps of locating, on the ventral side of the half-carcass 1A, 1B, an anatomical structure 7 defined in relation to joints between rib heads and the spinal column 3 of the half-carcass 1A, 1B, and determining a characteristic geometrical feature 15 of the median cut surface 6 and/or of the ventral side of the half-carcass 1A, 1B.

It is noted that "locating" and "determining" both refers to a situation where an image is obtained of the half-carcass 1A, 1B and that locating is used to indicate that the position of well-defined anatomical structure is located in the image, and the determining is used to indicate that the feature relates to the geometry of a point or part of the bones in the half-carcass.

Figure 3:
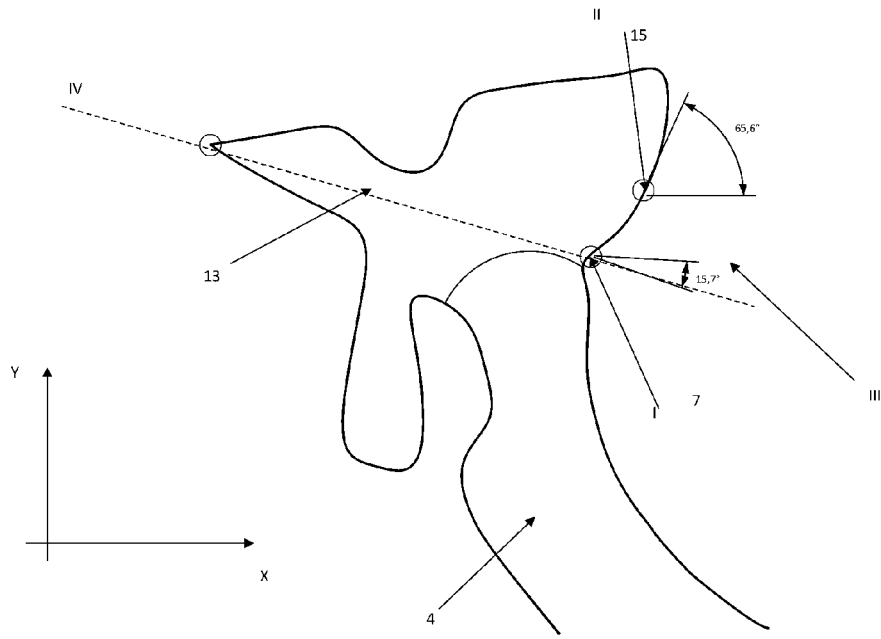
FIG. 3 is a schematically illustration of a method according to a preferred embodiment of the invention.
Figure 4:
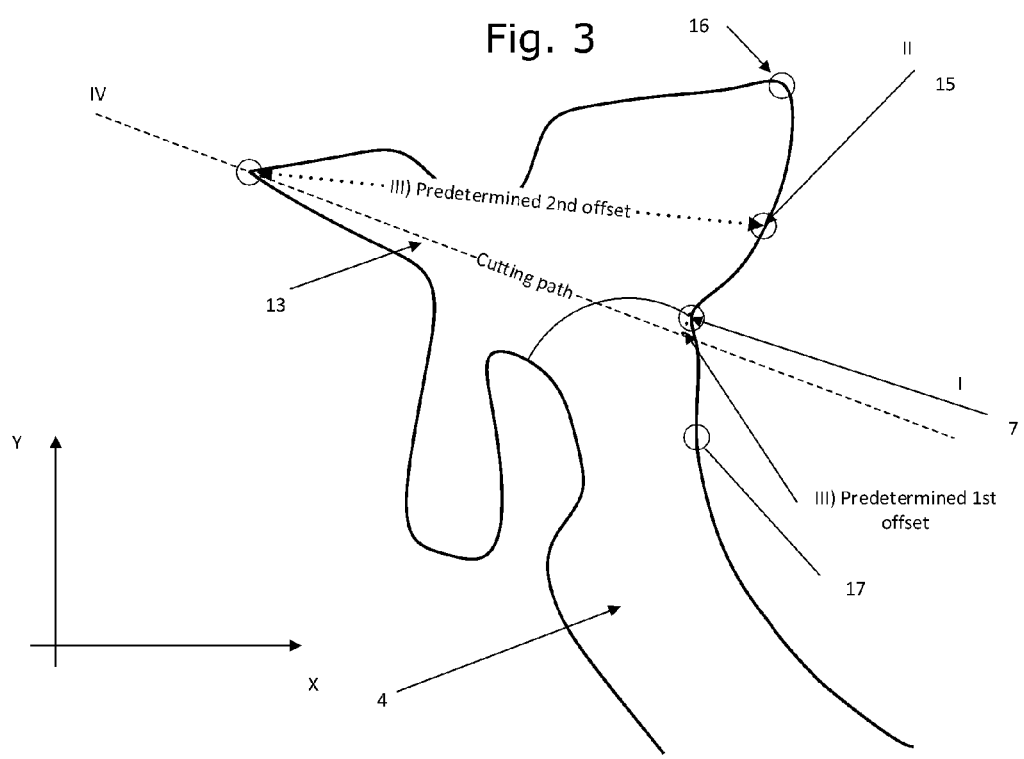
FIG. 4 is a schematically illustration of a method according to a further preferred embodiment of the invention.

The characteristic geometrical feature 15 may as indicated in FIGS. 3 and 4 comprise a position (FIG. 4) on and/or a spatial orientation (FIG. 3) of at least a part of the exposed rib or spinal column.

Based on the characteristic geometrical feature 15 is located and the anatomical structure 7 is located, the cutting along a cutting path 13 is defined in relation to those two features said anatomical structure (7) so as to, at least partly, remove the spinal column from the half-carcass 1A, 1B.

As shown in FIGS. 3 and 4, the cutting path 13 pass through a position being offset a predetermined first offset to the located anatomical feature 7 and a position in the half-carcass 1A, 1B being offset a predetermined second offset from the characteristic geometrical feature 15. It is noted, that the first and/or the second offset may be zero.

The offset may typically be predetermined by an operator operating the cutting equipment input a value for the first and the second offset to cutting device (controlled by a computer). The operator evaluates the cut provided and if the initial input offset values provides a cut which is not the operator's satisfaction due to e.g. too much removal of meat or to little removal of spinal column the operator adjust the first and/or second offset. This procedure is continued until the operator is satisfied with the cutting. After that, the offsets typically remains unchanged until an operator finds reason to change one or more of the offsets.

While the offsets typically are predetermined by an operator, the offsets may alternatively be predetermined in an automated manner, where vision equipment evaluates the cutting and changes the offsets until a desired result is obtained.

Figure 5A:
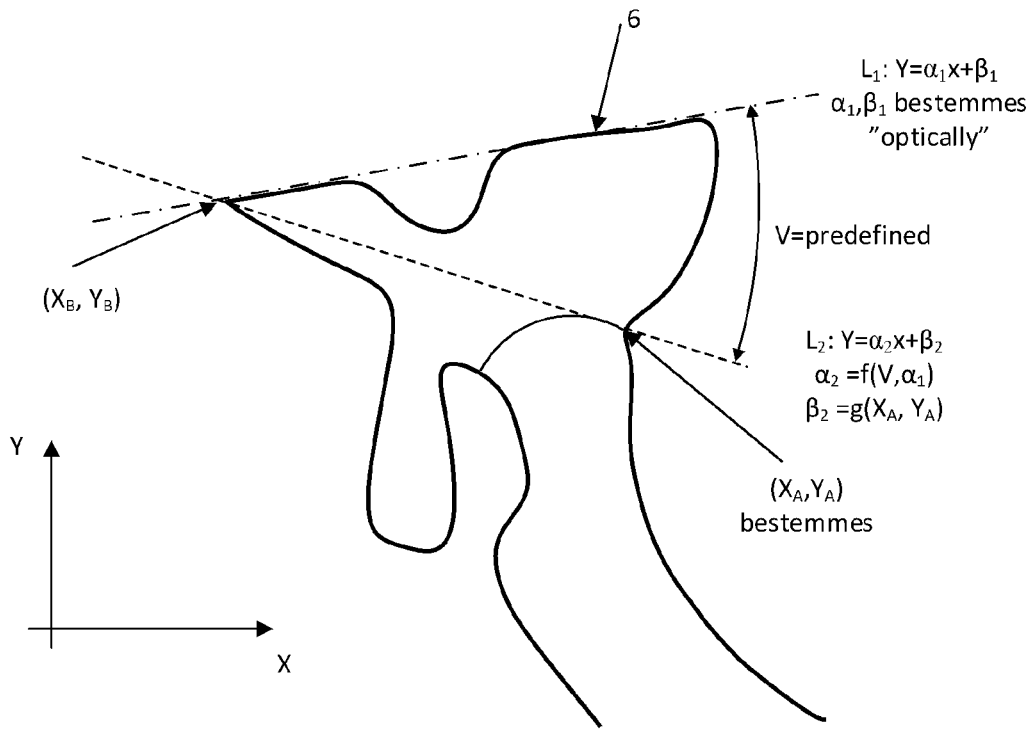
FIGS. 5A and 5B are schematic illustrations of a method according to a further embodiment of the invention.

As shown in FIGS. 3 and 5A, the characteristic geometrical feature may be a spatial orientation. In FIG. 3, the characteristic geometrical feature 15 is the angle of the tangent in a point on the spinal column which in the example of FIG. 3 is shown to be 65.5° and the predetermined offset angle is 15.7° (as indicated in FIG. 3, reference III). Thus, the cutting is made so that the cutting path is angled 65.5°+15.7° to the tangent in the point considered.

Figure 5B:
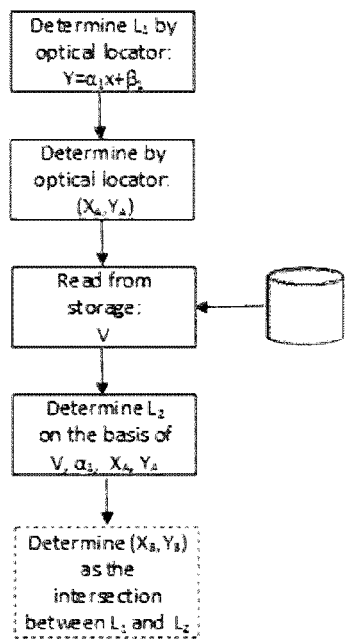
Figure 6:
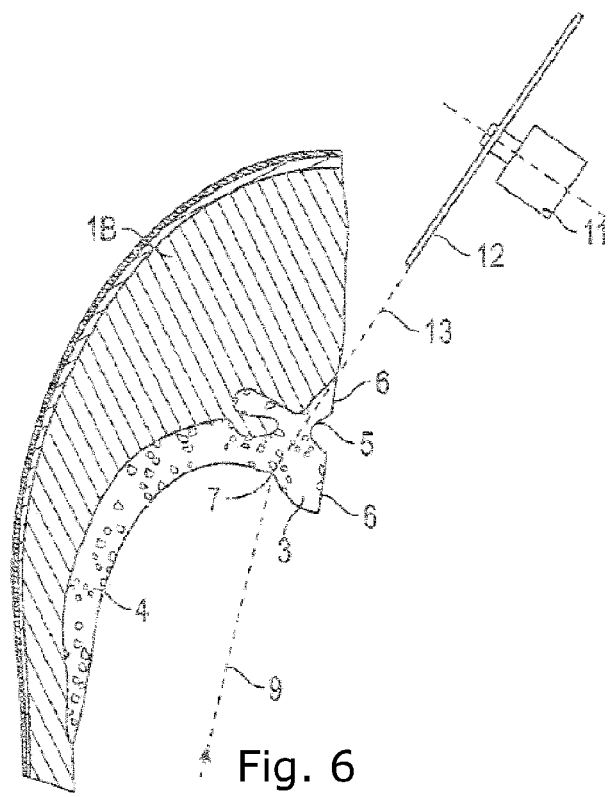
FIG. 6 is a schematically illustration of an embodiment of removal of the spinal column according to a further embodiment of the invention where the half-carcass is suspended in a vertical orientation.

As shown in FIGS. 5A and 5B, the characteristic geometrical feature 15 is the spatial orientation of the median cut surface 6, and the second offset is a predetermined angle V with the characteristic geometrical feature. In this case, no first offset is used. As indicated above, the first and/or the second offset is equal to zero.

Reference is made to FIG. 4. In this embodiment, the characteristic geometrical feature 15 is a position and the first and second offset is a predetermined orientated distance from the characteristic geometrical feature 15. The characteristic geometrical feature 15 is typically selected as a position on the spinal column which is easy recognisable in an image and may e.g. be selected as the point positioned a certain distance from e.g. the upper most position of the spinal column 16. Similarly, the location of the anatomical structure may be carried out in a similar manner.

The anatomical structure 7 may preferably be selected as a concavity defined in relation to the joint between rib heads and thoracic vertebrae, top of rib heads, or a concavity below the rib head 17.

The characteristic geometrical feature 15 may preferably be selected as spinous process, the spatial orientation of the median cut surface 6, spinal canal, the upper most position of the spinal column 16, or the tangent to the surface between the upper most position of the spinal column 16 and the anatomical structure 7.

Reference is made to FIGS. 5A and 5b. As disclosed herein, a cutting path is determined to optimally remove the spinal column, i.e. without removing too much meat and not leaving too much bone. FIG. 5A shows a half vertebra of the spinal column 3 and a rib 4 in the half-carcass. It is desired to cut along a plane cutting path defined by the line $L_2$ intersecting the concavity 7 such as its "deepest" point and the point $(X_B, Y_B)$ near the tip of the spinous process of the vertebra. The point $(X_A, Y_A)$ can be identified and located optically by devices corresponding to the optical scanner 10 used to locate the concavity 7 whereby the cutting path can be determined, or the cutting path 13 can be determined based on the spatial orientation of the median cut surface 6, which is preferably determined optically. The cutting path 13 is then determined as the plane intersecting the concavity 7 and forming a predetermined angle V with the median cut surface 6. Although the cutting path 13 herein is disclosed as a straight line, the cutting path may be curved. For instance, in cases where curved saw is used, the cutting path may reflect the shape of the knife.

The predetermined angle V of the cutting path 13 relative to the median cut surface 6 depends on e.g. the species of the animal and/or the size of the animal and/or the position along the spinal column. The location and angle of the cutting path 13 may be further adjusted manually or adaptively. FIG. 2 shows the cutting path 13A as determined automatically, and alternative cutting paths 13B and 13C are examples of further adjusted cutting paths.

FIG. 5B illustrates steps in the process of determining the cutting path 13. The median cut surface 6 as represented by the line $L_1$ is defined by $Y=\alpha_1 x+\beta_1$ which is preferably determined using optical locator. The coordinates $(X_A, Y_A)$ of the concavity 7 are determined as mentioned above, preferably by optical locator. The predetermined angle V is retrieved from a storage, and the cutting path 13 as represented by the line $L_2$ defined by $Y=\alpha_2 x+\beta_2$ is determined by a controller (not shown) based on the values of $X_A$, $Y_A$, $\alpha_1$ and V. The predetermined angle (V) of the cutting path typically depends on the species of the animal and/or the size of the animal and/or the position along the spinal column 3. In a further embodiment, an offset may be added to one or both of the coordinates $(X_A, Y_A)$, for instance to alter the orientation of the line $L_2$ if so desired.

Cutting can be performed by using cutting device known in the art, such as a circular cutting blade 12 driven by a motor 11, a reciprocating cutting blade 12 driven by a motor 11, an endless cutting blade 12 driven by a motor 11 or a water-jet cutting device. The motor 11 with the cutting blade 12 (or water-jet cutting device) is moved by a robotic arm (not shown) controlled by the controller so that the cutting blade follows the determined cutting path 13 to eventually remove the spinal column at least partly.

The interaction of the cutting blade with the half-carcass may cause the half-carcass to move on the conveyer which may cause the cutting blade to follow a wrong cutting path. In order to ensure that the cutting blade follows the desired cutting path it is advantageous to have mechanical stabilisers for stabilising the position of the half-carcass on the conveyer against undesired movements on the conveyer.

It is noted that the present invention also includes embodiments in which the half-carcass is not moved during cutting, in which case the cutting blade is moved along the longitudinal direction of the half-carcass. Further, the cutting may be performed from ventral side, towards the ventral side or combinations thereof.

Figure 7:
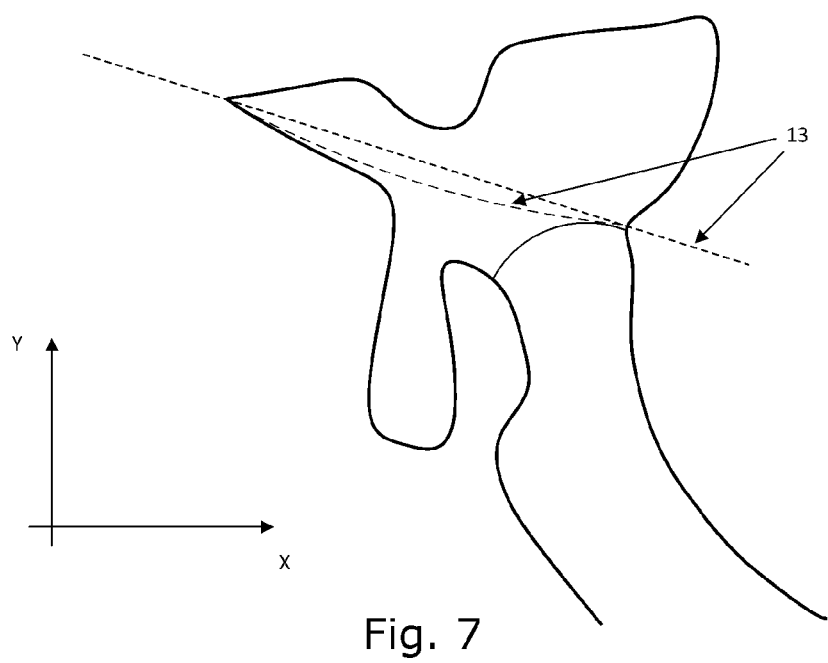
FIG. 7 is a schematically illustration of two different cutting paths.

As shown in FIG. 7 the actual provided cutting path 13 may depend on the cutting device used. The straight line 13 indicates a cut provided with e.g. a cutting blade formed as flat disc thereby providing a straight cut. The curved line 13 illustrates a cut provided with a curved cutting blade e.g. with a band saw.

The invention can be implemented by use of hardware, software, firmware or any combination of these. The invention or some of the features thereof can also be implemented as software running on one or more data processors and/or digital signal processors.

As presented herein, many of the embodiments of the invention resides in locating an anatomical structure and determining a characteristic geometrical feature by use of imaging. Preferably, the imaging is based on electromagnetic radiation which may be characterised as making use of reflection of electromagnetic radiation or transmission of electromagnetic radiation.

On Reflection of Electromagnetic Radiation

In one embodiment laser light (or other light source) is directed towards the half-carcass. One or more cameras are used in a triangulation to obtain an image. The half-carcass can be moved and/or the camera as well as the light source can be moved in order to obtain an image.

In a further embodiment, stereo-vision is applied. In such embodiments, two cameras are used, in which a calibration of the mutual positioning of the cameras is carried out prior to use. An image is obtained by each camera of the same object and by combining the images information about the depth (distance from camera) can be provided.

In yet a further embodiment, the so-called time-of-flight method is applied. The time-of-flight method may be implemented in different manner and comprises on an overall level measuring the time spend for the light to travel from the light source, to the half-carcass and to a light receiver, typically placed at the light source. Thereby, the distance from the light source to the position where the light "hits" the half-carcass can be determined. In order to increase the precision, phase shift technologies (or similar) may be implemented. The time-of-flight method may be implemented both with and without measurements of the light intensity.

In yet a further embodiment, so-called structural light is applied. The structural light is characterised by a light source emitting a light pattern (often infra-red). A camera makes an image of the reflected light pattern. By use of image processing the light pattern can be identified in the image. The size of individual elements in the pattern provides the distance to the object reflecting the elements in the pattern. A calibration is performed between the light source and the camera. Advantageously, this approach may be supplemented by a providing an image without a light pattern so this image may be combined with the image obtained by the light pattern in order to get both depth and light intensity measurements.

On Transmission of Electromagnetic Radiation

In one embodiment, x-ray radiation is applied. An x-ray source transmit x-ray and a detector is arranged to detect x-rays transmitted through the half-carcass. The amount of x-rays detected is used to provide a 3D image of the half-carcass; in order to obtain the 3D image, a number of x-ray sources are used, the half-carcass is moved during radiation and/or the x-ray source(s) are moved. The use of x-ray can further provide information as to the thickness of bones and position thereof.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED 1 carcass
2 median plane
3 spinal column
4 rib
5 spinal canal
6 median cut surface
7 anatomical structure such as a concavity defined in relation to joint between rib heads and thoracic vertebrae
8 conveyer
9 line of sight
10 optical scanner
11 motor of cutting device
12 knife of cutting device
13 cutting path
15 characteristic geometrical feature
16 the upper most position of the spinal column,
17 anatomical structure such as a concavity below the rib head

What is claimed is:

1. A method of removing, at least partly, the spinal column from a half-carcass of a slaughtered animal that has been cut substantially along the median plane of the slaughtered animal thereby providing a median cut surface of the half-carcass, the method comprising:
    locating, on the ventral side of the half-carcass, an anatomical structure defined in relation to joints between rib heads and the spinal column of the half-carcass,
    determining a characteristic geometrical feature of the median cut surface and/or of the ventral side of the half-carcass, the characteristic geometrical feature comprising:
        a position on and/or a spatial orientation of at least a part of the exposed rib or spinal column, and
    cutting along a cutting path, the cutting path being defined in relation to said anatomical structure and said characteristic geometrical feature of the median cut surface and/or of the ventral side of the half-carcass, so as to remove, at least partly, the spinal column from the half-carcass.

2. The method according to claim 1, wherein the cutting path passes through a position being offset a predetermined first offset to the located anatomical feature and a position in the half-carcass being offset a predetermined second offset from the characteristic geometrical feature.

3. The method according to claim 2, wherein the characteristic geometrical feature is a spatial orientation, or the spatial orientation of the median cut surface, and wherein the second offset is a predetermined angle (V) with the characteristic geometrical feature.

4. The method according to claim 2, wherein the characteristic geometrical feature is a position and wherein the second offset is a predetermined orientated distance from the characteristic geometrical feature.

5. The method according to claim 2, wherein the first and/or the second offset is equal to zero.

6. The method according to claim 1, wherein the anatomical structure is a concavity defined in relation to the joint between rib heads and thoracic vertebrae,
top of rib heads, or
a concavity below the rib head.

7. The method according to claim 1, wherein the characteristic geometrical feature is:
    spinous process,
    the spatial orientation of the median cut surface,
    spinal canal,
    the upper most position of the spinal column, or
    the tangent to the surface between the upper most position of the spinal column and the anatomical structure.

8. The method according to claim 1, wherein the anatomical structure located is a concavity defined in relation to joints between rib heads and the spinal column of the half-carcass,
    the characteristic geometrical feature determined is the spatial orientation of the median cut surface, and
    the cutting path intersects the concavity or intersects a predetermined first offset therefrom and forming a predetermined angle (V) with the median cut surface so as to remove, at least partly, the spinal column from the half-carcass.

9. The method according to claim 1, wherein locating the anatomical structure is done using an optical and/or mechanical locator providing data on a zone of the half-carcass.

10. The method according to claim 1, wherein the characteristic geometrical feature is determined using an optical and/or mechanical locator.

11. The method according to claim 1, wherein the anatomical feature is located using an optical and/or mechanical locator.

12. The method according to claim 1, comprising:
    moving the half-carcass, while supported by a conveyer, along a longitudinal direction of the spinal column,
    illuminating the ventral side of the moving half-carcass, and
    obtaining image data on the zone of the half-carcass.

13. A method according to claim 12, wherein
    illuminating the ventral side of the half-carcass includes projecting a beam of light defining a plane of light transverse to the direction of movement, and
    receiving projected light reflected from the half-carcass with a camera situated outside the plane of light to obtain profile information on the zone of the half-carcass.

14. The method according to claim 1, wherein the half-carcass is arranged on a conveyer and wherein the position of the half-carcass on the conveyer is stabilized.

15. The method according to claim 12, wherein the half-carcass is arranged suspended in an orientation, the method further comprising:
    illuminating the ventral side of the half-carcass by projecting a beam of light defining a plane of light transverse to the longitudinal direction of the spinal column, and
    receiving projected light reflected from the half-carcass with a camera situated outside the plane of light to obtain profile information on the zone of the half-carcass including at least the concavity.

16. The method according to claim 1, wherein the half-carcass is arranged on a conveyer, said conveyer comprising an encoder providing data on movements of the conveyer and thereby the half-carcass.

* * * * *